United States Patent Office 2,779,927
Patented Jan. 29, 1957

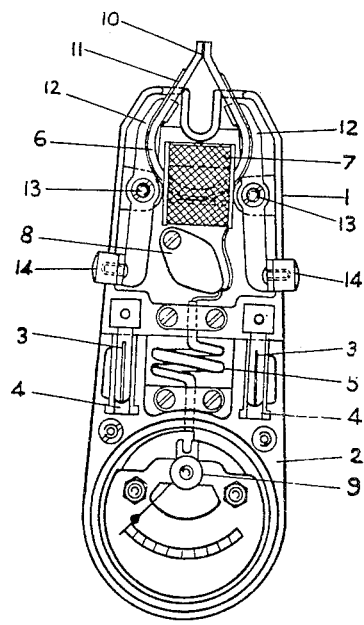

2,779,927
A. C. ELECTRICAL MEASURING INSTRUMENTS

Thomas Richard Rudge, Timperley, Altrincham, England, assignor to The General Electric Company Limited, London, England Application May 20, 1952, Serial No. 288,793

Claims priority, application Great Britain May 24, 1951

3 Claims. (Cl. 336—175)

This invention relates to alternating current electrical measuring instruments. The invention is concerned in particular with alternating current electrical measuring instruments of the kind including a transformer unit which comprises a core of magnetic material which may be linked with a conductor carrying an alternating current so as to induce a current in a secondary coil wound on the core. Instruments of this kind may be used for making measurements on a circuit without the necessity of breaking the circuit to connect the instrument in it.

It is an object of the present invention to provide an improved transformer unit for an alternating current electrical measuring instrument of the kind specified.

According to the invention, in a transformer unit for an alternating current electrical measuring instrument of the kind specified the core is in the form of a loop of magnetic material divided at one point so as to form two free ends which are normally urged together by means of a spring encircling the loop, the surfaces of the free ends which abut on each other being covered with thin coatings of wear-resistant nonmagnetic material.

One arrangement in accordance with the present invention will now be described, by way of example, with reference to the accompanying drawing, which is a front view of a clip-on alternating current milliammeter with the front half of the casing removed.

Referring to the drawing, the milliammeter is constructed in two parts, a transformer unit and an instrument unit which are housed in separate cases 1 and 2 respectively. The two units may be mechanically combined by means of plugs 3 mounted in the transformer unit and adapted to engage in sockets 4 in the instrument unit, and a flexible wire lead 5 is provided for electrical connection between the two units so that the transformer unit may be separated from the instrument unit and mounted on a circuit on which a measurement is to be made while the instrument unit is retained in a position suitable for observation.

The transformer unit includes a core 6 in the form of a loop of magnetic material divided at one point so that it may be linked with a conductor carrying the current which is to be measured. On the loop 6 is wound a secondary coil 7, the current induced in which is rectified by means of a metal rectifier 8 mounted in the transformer unit, the rectified current being measured by means of a direct current moving coil instrument 9 mounted in the instrument unit.

The free ends 10 of the loop 6 are normally urged together by means of a spring 11 which encircles the loop 6, two levers 12 mounted on pivots 13 and arranged to be operated by press studs 14 being provided in the transformer unit for urging apart the free ends 10 of the loop 6 when it is desired to link the loop 6 with a conductor carrying current to be measured. The surfaces of the free ends 10 of the loop 6 which abut on each other are provided with a wear-resistant chromium plating about .001" thick. This plating ensures that there is a constant gap in the magnetic circuit, irrespective of the pressure of the spring 11, so that the reluctance of the core is maintained constant, which would not be the case if no such coating were provided.

It will be appreciated that the construction of the core of the transformer unit described above ensures that the losses in the transformer core are considerably lower than is the case with other types of instruments of the kind specified in which the transformer core is constructed with hinged joints. This feature is of course most desirable where it is necessary to measure small currents, for example currents of the order of 200 milliamperes which may be the case when measuring currents in the power supply of a radio broadcast receiver.

I claim:

1. A transformer unit for an alternating current electrical measuring instrument, comprising a core of magnetic material in the form of a flexible loop divided at one point only so as to form two free ends which can be moved toward and away from one another, a spring encircling a major portion of the loop exclusive of the two free ends, the spring being expanded from its natural configuration whereby said free ends are biassed together but can be urged apart against the force of the spring, and a secondary coil wound on the core, the surfaces of said free ends which abut on each other being covered with thin coatings of a wear-resistant non-magnetic material.

2. A transformer unit according to claim 1, in which said coatings are in the form of chromium plating.

3. A transformer unit according to claim 1, including a pair of levers for urging apart the free ends of the loop, the levers being pivoted about points intermediate along their lengths and respectively having free ends which bear against the inside of the loop at points disposed in opposite directions away from said free ends of the loop.

References Cited in the file of this patent

UNITED STATES PATENTS

| 1,830,541 | Harris | Nov. 3, 1931 |
| 1,981,259 | Wertz | Nov. 20, 1934 |
| 2,351,377 | Warsher | June 13, 1944 |
| 2,375,591 | Schweitzer | May 8, 1945 |
| 2,478,029 | Vienneau | Aug. 2, 1949 |
| 2,494,206 | Ross | Jan. 10, 1950 |

FOREIGN PATENTS

| 624,455 | Germany | Jan. 21, 1936 |